US008479774B2

(12) United States Patent
Baugh

(10) Patent No.: US 8,479,774 B2
(45) Date of Patent: Jul. 9, 2013

(54) ACCUMULATOR WITH SINGLE DIRECTION SEAL

(76) Inventor: Benton Frederick Baugh, Houston, TX (US)

( * ) Notice: Subject to any disclaimer, the term of this patent is extended or adjusted under 35 U.S.C. 154(b) by 130 days.

(21) Appl. No.: 13/136,046

(22) Filed: Jul. 22, 2011

(65) Prior Publication Data

US 2013/0019980 A1 Jan. 24, 2013

(51) Int. Cl.
*F16L 55/04* (2006.01)

(52) U.S. Cl.
USPC .................... 138/31; 138/30; 138/26; 60/415

(58) Field of Classification Search
USPC ................. 138/31, 30; 166/364, 368; 60/414, 60/415
See application file for complete search history.

(56) References Cited

U.S. PATENT DOCUMENTS 3,018,627 A * 1/1962 Perricci ........................... 60/634
3,918,498 A * 11/1975 Schneider ........................ 138/31
4,205,594 A * 6/1980 Burke ............................... 92/65
4,649,704 A * 3/1987 Marsh ............................. 60/415
6,202,753 B1 3/2001 Baugh
6,266,959 B1 * 7/2001 Markwart ........................ 60/414
6,418,970 B1 * 7/2002 Deul ............................... 138/31
7,926,501 B2 * 4/2011 Springett et al. ................ 137/14
2005/0155658 A1 * 7/2005 White ............................. 138/31

OTHER PUBLICATIONS

Advancements in Subsea BOP Stack Equipment & Controls, Frank Springett & Dan Franklin, National Oilwell Varco/ 2007.

* cited by examiner

*Primary Examiner* — Patrick F Brinson

(57) ABSTRACT

A depth compensated subsea accumulator with a cylinder with a cylinder end, a first larger bore, a cylinder shoulder and a second smaller bore, a piston sealingly and slidably engaging the first large bore with a single direction seal and having a rod attached to a first side, the rod sealingly and slidably engaging the second smaller bore, the piston having a working fluid on the first side and a compressed gas on the second side, the working fluid on the first side of the piston having a higher pressure than the gas on the second side of the piston while the piston is moving between the cylinder end and the cylinder shoulder, when the piston sealingly engages the cylinder shoulder, a portion of the working fluid on the first side of the piston within a seal diameter having a lower pressure than the gas on the second side of the piston and a portion of the working fluid on the first side of the piston outside the seal diameter having a higher pressure than the gas on the second side of the piston, such that the single direction seal always encounters pressure from the same direction.

6 Claims, 7 Drawing Sheets

ACCUMULATOR WITH SINGLE DIRECTION SEAL

TECHNICAL FIELD

This invention relates to the general subject of providing a subsea accumulator having a single direction dynamic seal in conditions which may encounter a pressure differential from either side.

CROSS-REFERENCE TO RELATED APPLICATIONS

Not applicable.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

The field of this invention is that of deepwater control systems for the purpose of providing a supply of pressurized working fluid for the control and operation of equipment. The equipment is typically subsea or deepwater blowout preventers (BOP) which are used to shut off the well bore to secure an oil or gas well from accidental discharges to the environment, gate valves for the control of flow of oil or gas to the surface or to other subsea locations, hydraulically actuated connectors and similar devices. The fluid to be pressurized is typically an oil based product or a water based product with added lubricity and corrosion protection.

The working fluid for such control systems typically comes from accumulators. Currently accumulators have historically come in three styles which operate on a common principle. The principle is to precharge them with pressurized gas to a pressure at or slightly below the anticipated minimum pressure required to operate equipment. Fluid can be added to the accumulator, increasing the pressure of the pressurized gas and the fluid. The fluid introduced into the accumulator is therefore stored at a pressure at least as high as the precharge pressure and is available for doing hydraulic work.

The accumulator styles are bladder type having a balloon type bladder to separate the gas from the fluid, the piston type having a piston sliding up and down a seal bore to separate the fluid from the gas, and a float type with a float providing a partial separation of the fluid from the gas and for closing a valve when the float approaches the bottom to prevent the escape of gas.

Accumulators providing typical 3000 p.s.i. working fluid to surface equipment can be of a 5000 p.s.i. working pressure and contain fluid which raises the precharge pressure from 3000 p.s.i. to 5000 p.s.i.

As accumulators are used in deeper water, the efficiency of conventional accumulators is decreased. In 1000 feet of seawater the ambient pressure is approximately 465 p.s.i. For an accumulator to provide a 3000 p.s.i. differential at 1000 ft. depth, it must actually be precharged to 3000 p.s.i. plus 465 p.s.i. or 3465 p.s.i.

At slightly over 4000 ft. water depth, the ambient pressure is almost 2000 p.s.i., so the precharge would be required to be 3000 p.s.i. plus 2000 p.s.i. or 5000 p.s.i. This would mean that the precharge would equal the working pressure of the accumulator. Any fluid introduced for storage would cause the pressure to exceed the working pressure, so the accumulator would be non-functional.

Another factor which makes the deepwater use of conventional accumulators impractical is the fact that the ambient temperature decreases to approximately 35 degrees F. If an accumulator is precharged to 5000 p.s.i. at a surface temperature of 80 degrees F., approximately 416 p.s.i. precharge will be lost simply because the temperature was reduced to 35 degrees F. Additionally, the rapid discharge of fluids from accumulators and the associated rapid expansion of the pressurizing gas causes a natural cooling of the gas. If an accumulator is quickly reduced in pressure from 5000 p.s.i. to 3000 p.s.i. without chance for heat to come into the accumulator (adiabatic), the pressure would actually drop to 2012 p.s.i.

A more recent solution to this problem has been what is referred to as constant differential accumulators as is illustrated in U.S. Pat. No. 6,202,753. These accumulators use a double piston looking like a barbell which acts as mechanical summing relay. On the top side of the top piston is the gas charge similar to the more conventional accumulators. On the lower side of the upper piston is the pressurized working fluid. The lower piston is connected to the upper piston by a connecting rod. Seawater pressure is vented onto the top side of the lower piston, pushing it down and therefore pulling the upper piston down harder onto the working fluid. A vacuum is on the lower side of the lower piston and so offers no support. The net effect is that the working fluid pressure is generally equal to the sum of the nitrogen pressure plus the seawater pressure. In other words its pressure is always higher than the ambient pressure by the amount of the nitrogen pressure. This provides a good solution irrespective of depths, but provides a relatively costly construction.

During normal operating conditions the top piston will have a higher fluid pressure below the piston than the gas pressure above the piston as the rod diameter effectively reduces the piston area on the bottom side. When the top piston travels down and impacts the central bulkhead between the pistons, the pressure of the fluid below the upper piston is reduced to the environmental pressure, or less than the gas pressure above the piston. For this reason, if single direction seals are used, two seals must be used with one in each direction. When the two seals are utilized, a higher or lower pressure can be locked between the seals increasing the differential pressure across the seals. Friction loading is increased by the fact that 2 seals are used, and that the pressure differential is increased across the seals.

Single directional seals are characteristically more rugged than bi-directional seals as they are not required to do as many tasks. This advantage is frequently offset by the problem of extra sliding friction and the tendency to trap or exclude pressure from between the seals. Over the years various solutions have been attempted to alleviate this problem, but all observed have retained the double friction of the two seals. In all cases this double friction reduces the efficiency of the systems using the accumulators or pistons.

SUMMARY OF THE INVENTION

The object of this invention is to provide a system with a single direction dynamic seal with a systems capability of sealing in both directions when required.

A second object of this invention is to provide a secondary seal when the piston of a cylinder engages an end of the cylinder.

A third object of the present invention is to eliminate the friction and energy wasted because of trapping high or low pressure between two bi-directional seals.

Another object of the present invention is to provide a secondary seal which will be engaged and disengaged under pressure without blowing the seal out of position or damaging it.

DESCRIPTION OF THE PREFERRED EMBODIMENT

Figure 1:
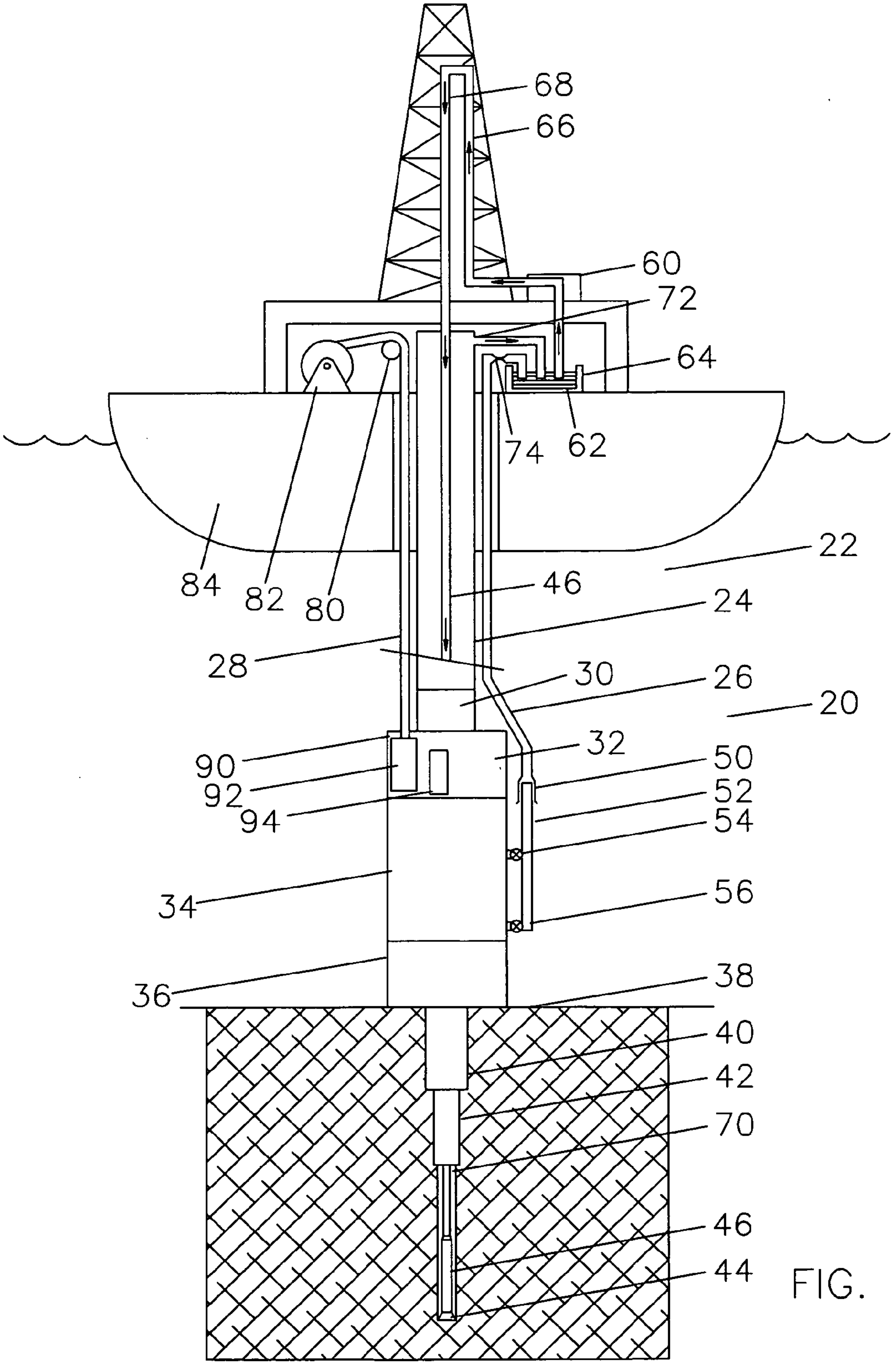
FIG. 1 is a view of a system of subsea equipment utilizing an accumulator with the seals of this method.

Referring now to FIG. 1, a view of a complete system for drilling subsea wells 20 is shown in order to illustrate the utility of the present invention. The drilling riser 22 is shown with a central pipe 24, outside fluid lines 26, and cables or hoses 28.

Below the drilling riser 22 is a flex joint 30, lower marine riser package 32, lower blowout preventer stack 34 and wellhead 36 landed on the seafloor 38.

Below the wellhead 36, it can be seen that a hole was drilled for a first casing string 40, that first casing string 40 was landed and cemented in place, a hole drilled through the first string for a second string, the second string 42 cemented in place, and a hole is being drilled for a third casing string by drill bit 44 on drill string 46.

The lower Blowout Preventer stack 34 generally comprises a lower hydraulic connector for connecting to the subsea wellhead system 36, usually 4 or 5 ram style Blowout Preventers, an annular preventer, and an upper mandrel for connection by the connector on the lower marine riser package 32, which are not individually shown but are well known in the art.

Below outside fluid line 26 is a choke and kill (C&K) connector 50 and a pipe 52 which is generally illustrative of a choke or kill line. Pipe 52 goes down to valves 54 and 56 which provide flow to or from the central bore of the blowout preventer stack as may be appropriate from time to time. Typically a kill line will enter the bore of the Blowout Preventers below the lowest ram and has the general function of pumping heavy fluid to the well to overburden the pressure in the bore or to "kill" the pressure. The general implication of this is that the heavier mud cannot be circulated into the well bore, but rather must be forced into the formations. A choke line will typically enter the well bore above the lowest ram and is generally intended to allow circulation in order to circulate heavier mud into the well to regain pressure control of the well. Normal circulation is down the drill string 46, through the drill bit 44.

In normal drilling circulation the mud pumps 60 take drilling mud 62 from tank 64. The drilling mud will be pumped up a standpipe 66 and down the upper end 68 of the drill string 46. It will be pumped down the drill string 46, out the drill bit 44, and return up the annular area 70 between the outside of the drill string 46 and the bore of the hole being drilled, up the bore of the casing 42, through the subsea wellhead system 36, the lower blowout preventer stack 34, the lower marine riser package 32, up the drilling riser 22, out a bell nipple 72 and back into the mud tank 64.

During situations in which an abnormally high pressure from the formation has entered the well bore, the thin walled central pipe 24 is typically not able to withstand the pressures involved. Rather than making the wall thickness of the relatively large bore drilling riser thick enough to withstand the pressu're, the flow is diverted to a choke line or outside fluid line 26. It is more economic to have a relatively thick wall in a small pipe to withstand the higher pressures than to have the proportionately thick wall in the larger riser pipe.

When higher pressures are to be contained, one of the annular or ram Blowout Preventers are closed around the drill pipe and the flow coming up the annular area around the drill pipe is diverted out through choke valve 54 into the pipe 52. The flow passes up through C&K connector 50, up pipe 26 which is attached to the outer diameter of the central pipe 24, through choking means illustrated at 74, and back into the mud tanks 64.

On the opposite side of the drilling riser 22 is shown a cable or hose 28 coming across a sheave 80 from a reel 82 on the vessel 84. The cable or hose 28 is shown characteristically entering the top 90 of the lower marine riser package. These cables typically carry hydraulic, electrical, multiplex electrical, or fiber optic signals. Typically there are at least two of these systems for redundancy, which are characteristically painted yellow and blue. As the cables or hoses 28 enter the top 90 of the lower marine riser package 32, they typically enter a control pod 92 to deliver their supply or signals. Hydraulic supply is delivered to a series of accumulators 94 located on the lower marine riser package 32 or the lower Blowout Preventer stack 34 to store hydraulic fluid under pressure until needed.

Figure 2:
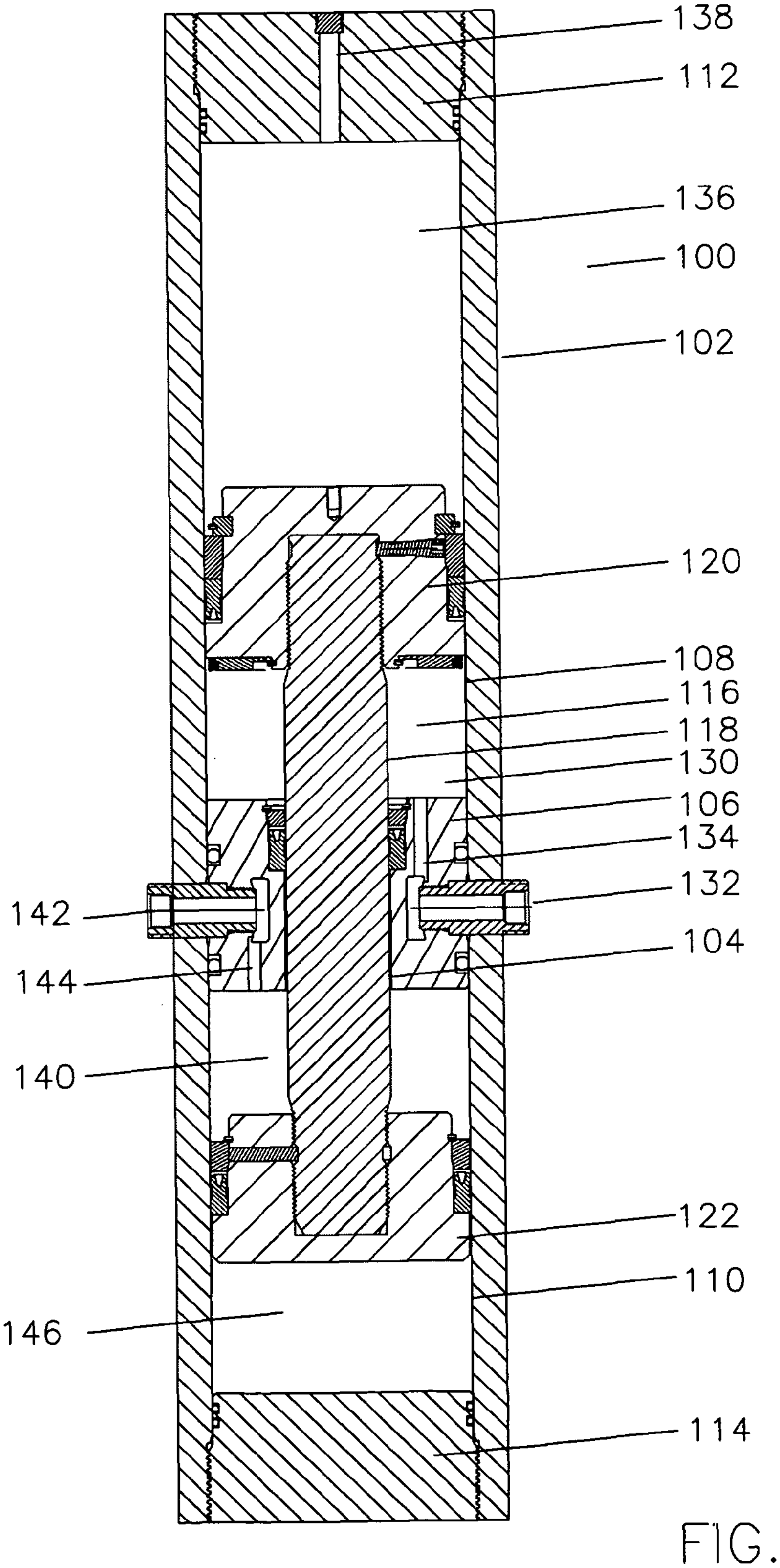
FIG. 2 is a half section of an accumulator using the seals of this method in the mid-stroke position of the piston.

Referring now to FIG. 2, accumulator 100 has a body 102, a smaller bore 104, an annular bulkhead 106, an upper bore 108, a lower bore 110, an upper bulkhead 112, and a lower bulkhead 114. Piston assembly 116 has a piston rod 118, an upper piston 120 and a lower piston 122.

Working fluid chamber 130 communicates with outlet port 132 through passageway 134. Nitrogen chamber 136 is charged with nitrogen through port 138. Compensation chamber 140 has seawater pressure introduced through port 142 and passageway 144. Vacuum chamber 146 is simply an empty chamber.

Figure 3:
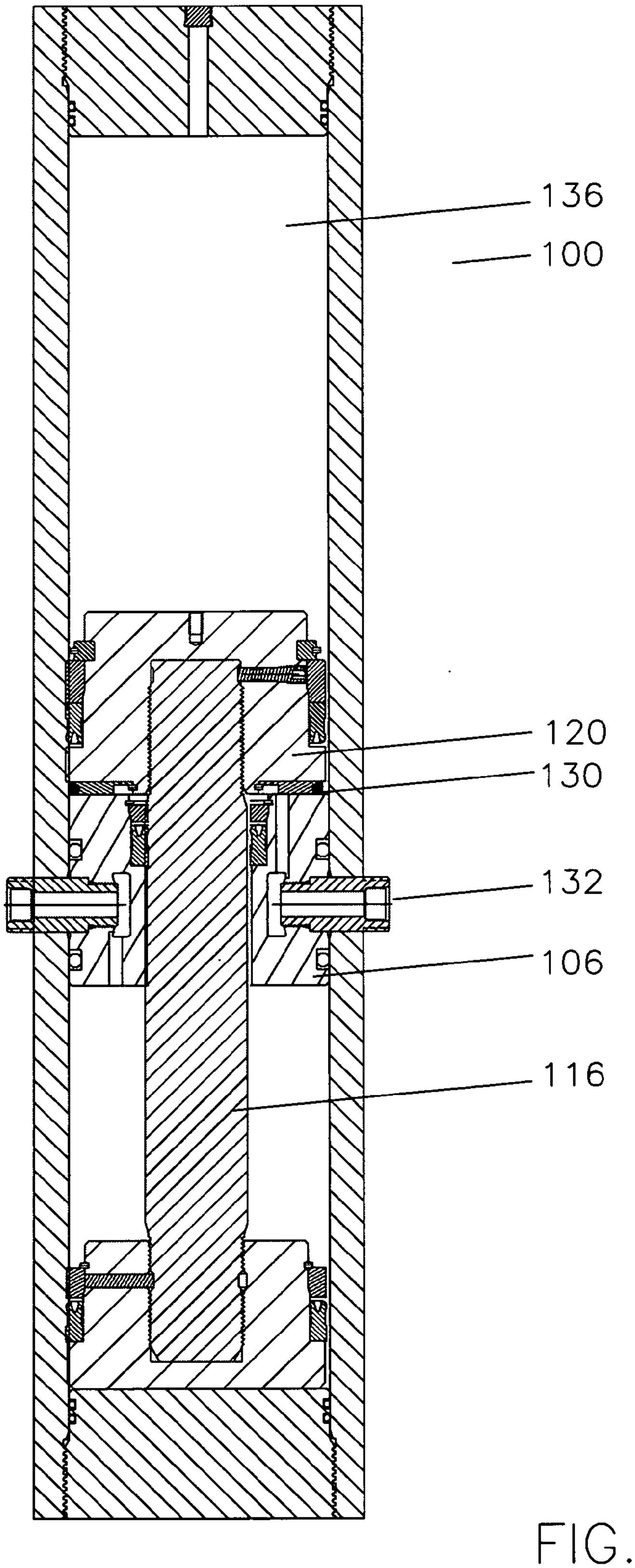
FIG. 3 is a half section of an accumulator using the seals of this method with the piston stroked down to fully discharge the liquids from the working chamber.

Referring now to FIG. 3 when the chamber 136 is being charged with nitrogen to a pressure such as 2520 p.s.i., piston assembly 116 moves down until upper piston 120 contacts annular bulkhead 106. Any fluid which was in working fluid chamber 130 is expelled through outlet port 132.

Figure 4:
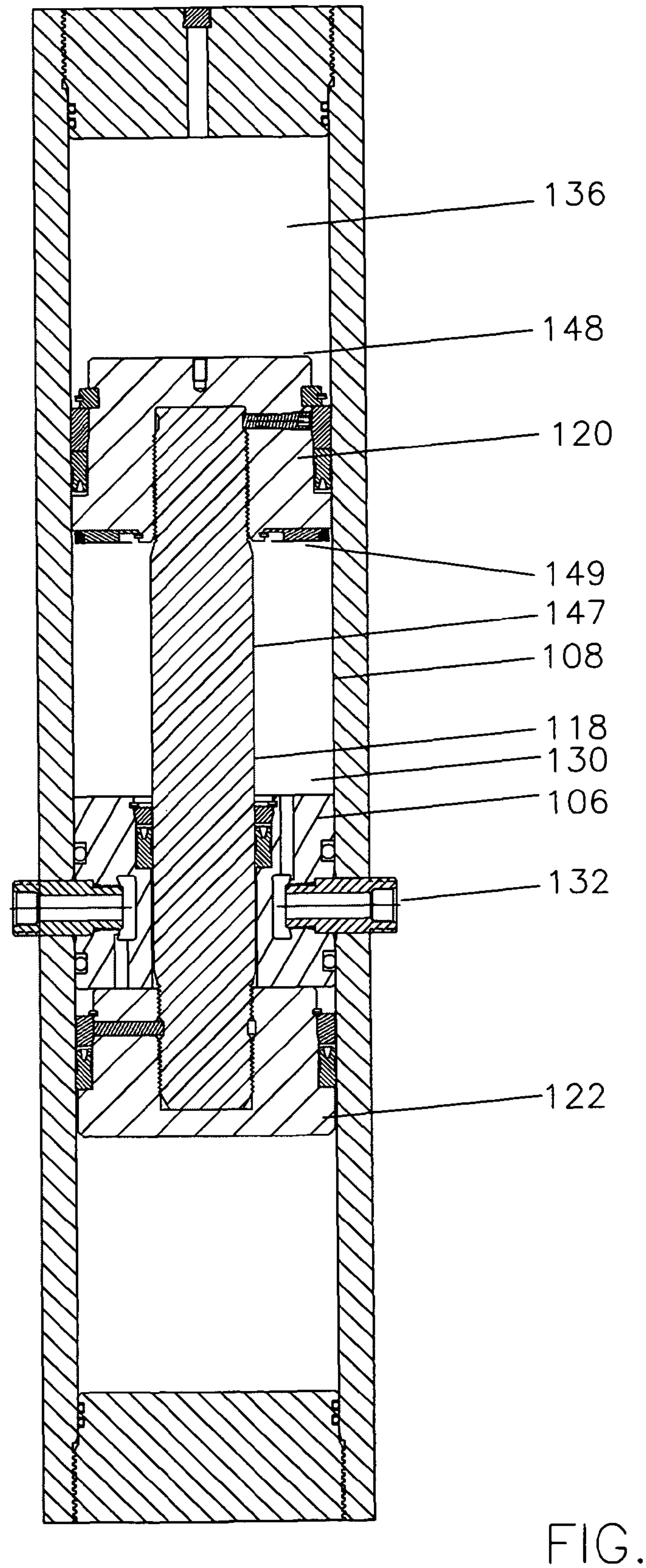
FIG. 4 is a half section of an accumulator using the seals of this method with the piston fully stroked up by a maximum charge of working fluids.

Referring now to FIG. 4 when working fluid chamber 130 is completely filled with fluid through outlet port 132, the lower piston 122 stops against annular bulkhead 106. At this time the nitrogen pressure in nitrogen chamber 136 will be approximately 4200 p.s.i. Given the cylinder bore 108 being approximately 10" and the rod 118 seal diameter 147 being approximately 4", the pressure area on the upper side 148 of upper piston 120 will be approximately 78.54 sq. in. and the annular piston area 149 on the lower side of will be approximately 65.98 sq. in. This means that the working fluid pressure within chamber 130 will need to be 5000 p.s.i. relative to the environment to compress the nitrogen to a pressure of 4200 p.s.i. Note that the pressure is higher on the lower side 149 of the upper piston 120 than on the upper side 148 of the upper piston 120.

Imagine at this time that the accumulator is in 10,000 feet of seawater with a gradient of 0.465 p.s.i./ft. This means that the environmental sea water pressure all around is 4650 p.s.i. This would mean that the actual pressure in the working fluid chamber would be 5000 plus 4650 or 9650 p.s.i., but with the depth compensated accumulator it operates as if it were at the surface.

Figure 5:
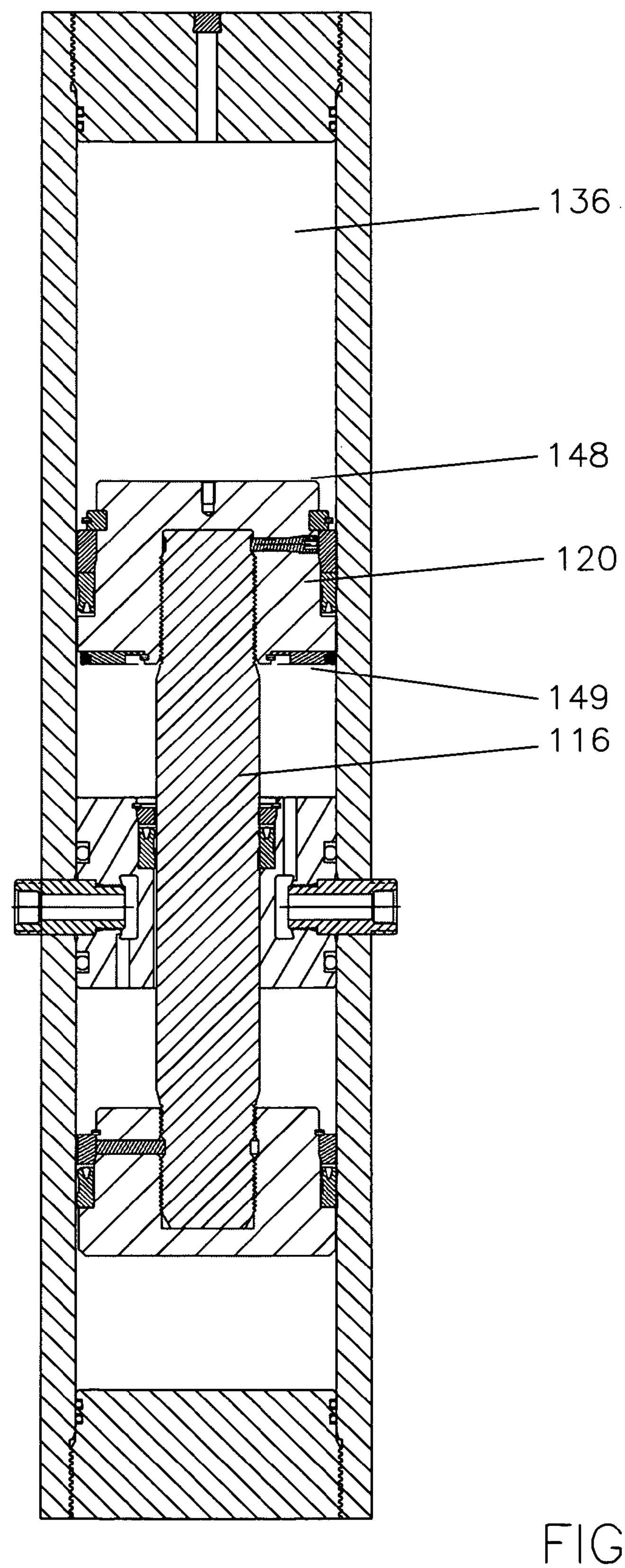
FIG. 5 is a half section of an accumulator using the seals of this method with the piston moved down to the mid-stroke position as seen in FIG. 2.

Referring now to FIG. 5, the piston assembly 116 has moved down to approximately mid stroke. At this time the nitrogen pressure in nitrogen chamber 136 would have declined half way between 4220 p.s.i. and 2520 p.s.i. or down to 3360 p.s.i. and the resulting working fluid pressure would be down to approximately 4000 p.s.i. It can be noted that during the stroke of the upper piston 120, the pressure on the lower side of the piston 149 will remain higher than the pressure on the upper side 148 of the piston 120. During the stroking, a single directional seal will be adequate for operations.

Figure 6:
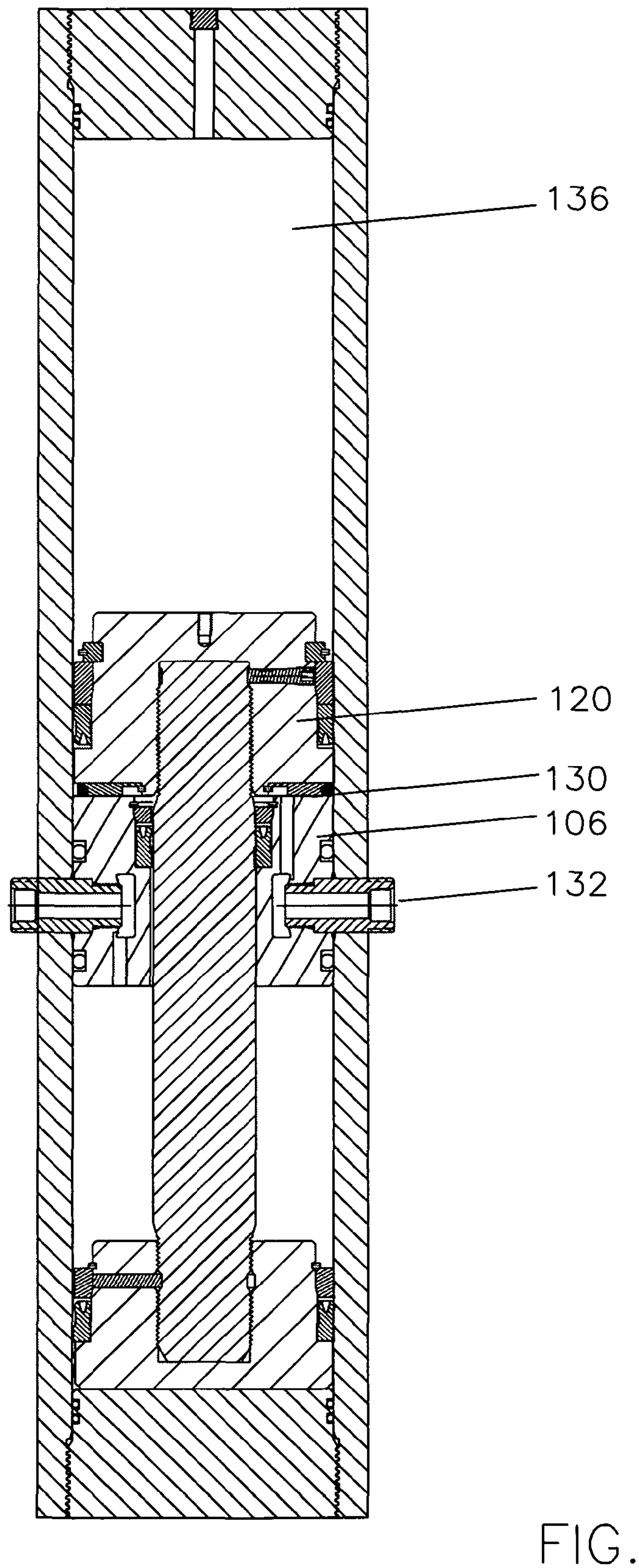
FIG. 6 is a half section of an accumulator using the seals of this method with the piston stroked down to fully discharge the liquids from the working chamber as seen if FIG. 3.

Referring now to FIG. 6, upper piston 120 has landed on annular bulkhead 106 and the pressure is vented out of outlet port 132, leaving the pressure on within working fluid chamber 130 effectively zero. The pressure above upper piston 120 is now approximately 2520 p.s.i. again and the pressure on the lower side of upper piston 120 is zero. In only this circumstance is the pressure reversed, at the end of the stroke. A seal for sealing in the opposite direction is now needed.

Figure 7:
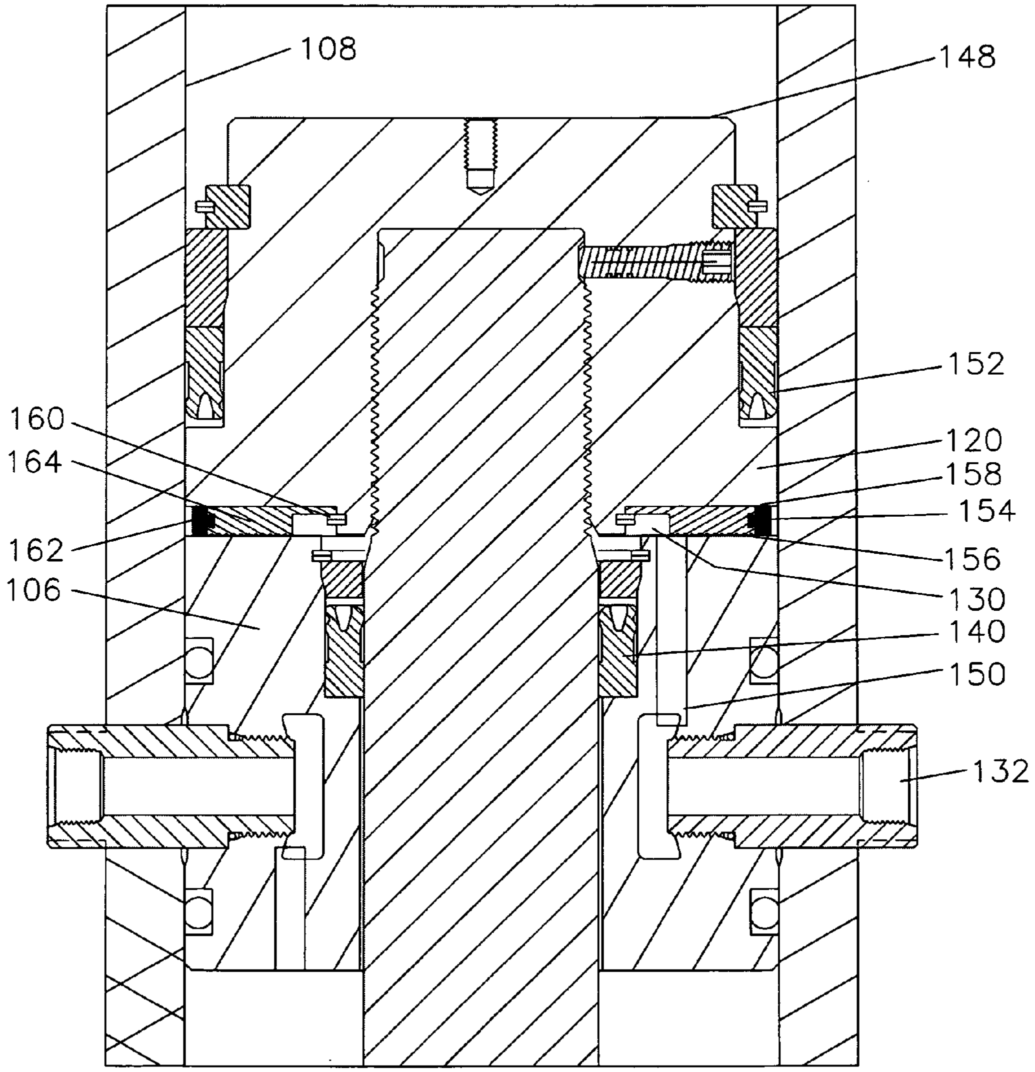
FIG. 7 is a partial half section of an accumulator using the seals of this method showing the piston in the position as seen in FIG. 6.

Referring now to FIG. 7, an enlarged view of the central portion of the accumulator is seen. Annular bulkhead 106 is engaged by outlet port 132 and provide passageway 150 to get pressurized fluid to working fluid chamber 130. Single directional seal 152 sealingly engages upper bore 108. Bonded seal 154 sealingly engages both the top side 156 of annular bulkhead and the lower side 158 of upper piston 120. Bonded seal 154 is retained to upper piston 120 by a circular lock ring 160.

The resilient seal portion 162 of bonded seal 154 is of a sufficiently large diameter relative to the upper bore 108 such that the maximum working fluid charge pressure (5000 p.s.i.) will act over the smaller piston area between the resilient seal portion 162 and the rod seal diameter 140 such that its force will overcome the current nitrogen pressure of 2520 p.s.i. over the entire area 148 of the top side of the upper piston 120. In the representative sizes given, this diameter would be a minimum of 8.15". The nearer to the upper bore diameter 108 of 10" means that the over pressurizing to get the initial movement would need to be. Additionally it is advantageous for resilient seal portion 162 to be bonded to the metal portion 164 of bonded seal 154 to keep pressure from blowing it out of a groove and damaging the seal.

In this way the single directional seal 152 is adequate for sealing in all cases with low friction except in the condition as indicated in FIG. 7, and a bonded seal 154 can seal in the opposite direction at that point.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. An accumulator with a single directional seal on a piston which has a working fluid side and a compressed gas side and which can be exposed to a pressure differential from said working fluid side to said compressed gas side during normal operations and from said compressed gas side to said working fluid side when said piston moves to the end of its stroke, comprising a cylinder with a cylinder bore having said piston slidably moving along said cylinder bore and having a first piston area on said compressed gas side of said piston, a rod attached to the said working fluid side of said piston, said rod and said cylinder bore defining a second piston area smaller than said first piston area, said compressed gas being on said first side of said piston and said working fluid being on said second side of said piston such that the pressure in said fluid is equal to or greater than the pressure in said compressed gas due to the difference in surface areas, such that when said piston moves to the location of fully expelling said fluid out of said accumulator, the movement of said piston is stopped and the pressure of said working fluid can drop to a lower pressure than the pressure in said compressed gas, such that when said piston moves to the location of fully expelling said fluid out of said accumulator, said piston engages a second seal which can seal a pressure differential from said working fluid side to said compressed gas side.

2. The apparatus of claim 1 further comprising said second seal manufactured of a resilient material which is bonded to a non-resilient material.

3. The apparatus of claim 1 further comprising said second seal is of sufficient diameter to define an area between said second seal and said rod times the maximum anticipated working fluid pressure provides sufficient force to move said piston when constrained by a force of said first piston area times the minimum anticipated compressed gas pressure.

4. A depth compensated subsea accumulator, comprising a cylinder with a cylinder end, a first larger bore, a cylinder shoulder and a second smaller bore, a piston sealingly and slidably engaging said first large bore with a single direction seal and having a rod attached to a first side, said rod sealingly and slidably engaging said second smaller bore, said piston having a working fluid on said first side and a compressed gas on the second side, said working fluid on said first side of said piston having a higher pressure than said gas on said second side of said piston while said piston is moving between said cylinder end and said cylinder shoulder, when said piston sealingly engages said cylinder shoulder, a portion of said working fluid on said first side of said piston within a seal diameter having a lower pressure than said gas on said second side of said piston and a portion of said working fluid on said first side of said piston outside said seal diameter having a higher pressure than said gas on said second side of said piston, such that said single direction seal always encounters pressure from the same direction.

5. The apparatus of claim 4 further comprising a second seal manufactured of a resilient material which is bonded to a non-resilient material.

6. The apparatus of claim 5 further comprising said second seal is of sufficient diameter to define an area between said second seal and said rod times the maximum anticipated working fluid pressure provides sufficient force to move said piston when constrained by a force of said first piston area times the minimum anticipated compressed gas pressure.

* * * * *